United States Patent Office 3,766,214
Patented Oct. 16, 1973

3,766,214
BENZOPYRAN COMPOUNDS
Chao-Han Lin and Arthur J. Wright, Dayton, Ohio, assignors to The National Cash Register Company, Dayton, Ohio
No Drawing. Filed Mar. 31, 1972, Ser. No. 240,114
Int. Cl. C07d 5/06, 5/32
U.S. Cl. 260—343.3       12 Claims

ABSTRACT OF THE DISCLOSURE

Colorless, but colorable benzopyran compounds are disclosed, which are represented by the formula:

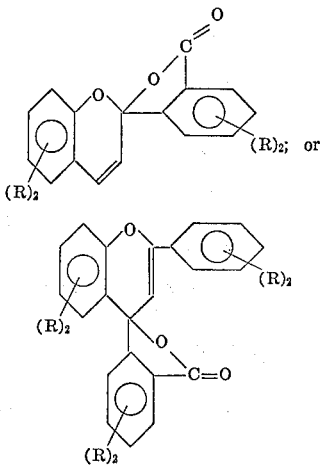

wherein each R is hydrogen, an alkyl radical having 1 to 5 carbon atoms, an alkoxy radical having 1 to 5 carbon atoms, a dialkylamino radical wherein each alkyl radical has 1 to 5 carbon atoms, an amino radical, a nitro radical or acetamido. These compounds are used in pressure-sensitive record material and in mark-forming manifold systems.

---

This invention relates to colorless, but colorable compounds. More specifically, this invention relates to certain benzopyran compounds.

These compounds are colorless or substantially colorless when in liquid solution, but are converted to dark-colored forms upon reactive contact with an acidic material. In pressure-sensitive mark-forming systems, the unreacted mark-forming components (the colorless, but colorable compound and the acidic material) and a liquid solvent in which each of the mark-forming components is soluble is disposed on or within a sheet support material. The liquid solvent is present in such form that is maintained isolated by a pressure-rupturable barrier from at least one of the mark-forming components until the application of pressure causes a breach of the barrier in the area delineated by the pressure pattern. The application of pressure brings the mark-forming components into reactive contact, thereby producing a distinctive mark.

The colors of many flowers and fruits are well known. Generally, these colors are due to the content of natural pigments. The basic structure of one such natural pigment is the flavylium nucleus:

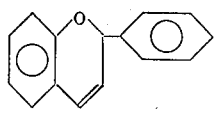

Often, this pigment is represented as a pyrylium salt, e.g. a chlorine salt:

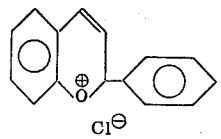

Another known compound is 7-dimethylamino-2-methoxy-2-phenyl-2(H) benzopyran represented by the structure:

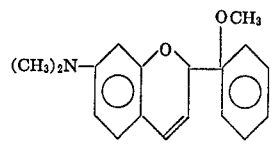

or
see The Journal of The American Chemical Society, volume 86, pages 3142 to 3145 (1964).

Certain colorless, but colorable benzopyran compounds now have been invented.

Accordingly, an object of this invention is to provide colorless, but colorable benzopyran compounds.

Other objects, aspects and advantages of this invention will be apparent to one skilled in the art from the following disclosure and appended claims.

The colorless, but colorable benzopyrans of this invention are represented by the formula:

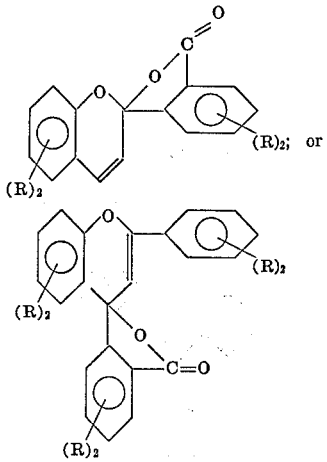

wherein each R is hydrogen, an alkyl radical having 1 to 5 carbon atoms, an alkoxy radical having 1 to 5 carbon atoms, a dialkylamino radical wherein each alkyl radical has 1 to 5 carbon atoms, an amino radical, a nitro radical or acetamido.

Specific examples of these benzopyrans are:

(a) 5 - dimethylamino - spiro[isofuran - 1(3H) - 2'(2H)-1-benzopyran-3-one]:

(b) 5',7' - dimethoxy - 5 - dimethylamino-spiro[isofuran-1(3H)-2'(2H)-1-benzopyran-3-one]:

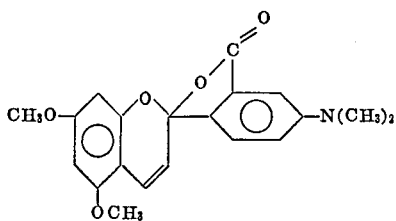

(c) 7' - dimethylamino - spiro[isofuran - 1(3H)-2'(2H)-1-benzopyran-3-one]:

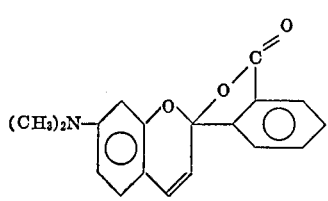

(d) 6'-methyl-5-dimethylamino-spiro[insofuran-1(3H)-2'(2H)-1-benzopyran-3-one]:

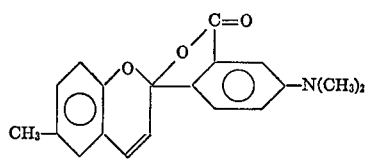

(e) 7'-dimethylamino-5-nitro-spiro[insofuran-1(3H)-2'(2H)-1-benzopyran-3-one]:

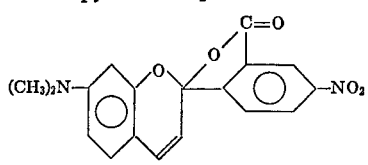

(f) 5-dimethylamino-2'-phenyl-spiro[insofuran-1(3H)-4'(4H)-1-benzopyran-3-one]:

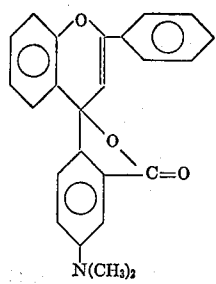

(g) 2'-(p-dimethylaminophenyl) - 5 - dimethylamino-spiro[isofuran-1(3H)-4'(4H)-1-benzopyran-3-one]:

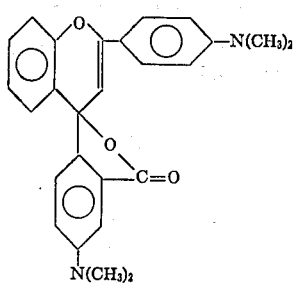

(h) 2'-(3,4-dimethoxyphenyl) - 5 - dimethylamino-spiro[insofuran-1(3H)-4'(4H)-1-benzopyran-3-one]:

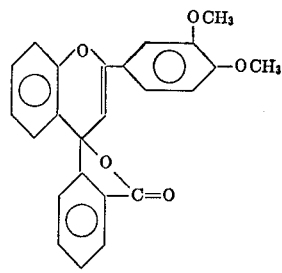

(i) 5-dimethylamino-2'-(p-nitrophenyl)-spiro[insofuran-1(3H)-4'(4H)-1-benzopyran-3-one]:

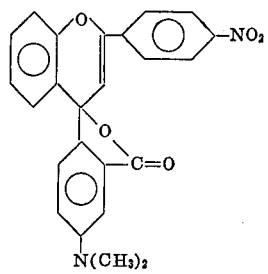

(j) 2' - (p - aminophenyl) - 5 - dimethylamino - spiro[insofuran-1(3H)-4'(4H)-1-benzopyran-3-one]:

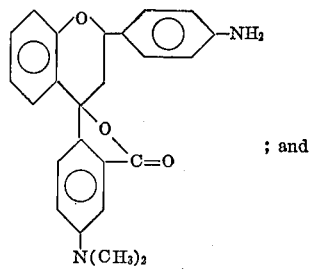

; and (k) 2' - (p - acetamidophenyl) - 5 - dimethylamino-spiro[isofuran-1(3H)-4'(4H)-1-benzopyran-3-one]:

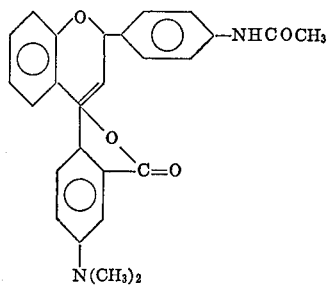

The colors developed from these compounds are blues, greens, blue-greens, reds, purples, and the like.

In a preferred embodiment of this invention, the benzopyran and liquid solvent are encapsulated in microscopic capsules which are coated on base sheet record material. In close contact with the base sheet record material is a sensitized undersheet. The base sheet yields the benzopyran under pressure of writing against the sensitized undersheet in a pattern of droplets corresponding to the written matter, in accordance with the disclosure of such a capsule-bearing sheet in U.S. Pat. No. 2,712,507 which issued July 5, 1955, on the application of Barrett K. Green. U.S. Pat. No. 2,712,507 also discloses a preferred method of forming the capsules. Other preferred methods for preparing solvent-containing microscopic capsules are disclosed in U.S. Pat. No. 2,800,457 which issued on July 23, 1957, on the application of Barrett K. Green and Lowell Schleicher and in U.S. Pat. No. 3,041,289, which issued on June 26, 1962, on the application of Bernard Katchem and Robert E. Miller.

The encapsulated droplets are released by the rupture of capsules in writing operations. The benzopyran liquid droplets are transferred in the pattern of the data configuration to the top of the underlying sheet. The top of the underlying sheet is coated or impregnated with at least one material which is an acid reactant with respect to the benzopyran and produces color with any such component that is reactive therewith. Representative acidic coating materials are, on one hand, oil-insoluble minerals or inorganic particulate solid material, represented by kaolin, attapulgite, silica gel, zeolites, and the like, and, on the other hand, organic polymeric acidic materials, such as acid-reacting phenolic resins of oil-soluble characteristics.

The record member consists of a base sheet or web member either of fibrous construction, such as paper, or of continuous structure, such as films of organic polymer material, carrying the color reactant in an exposed state with respect to applied liquid. The acid reactant, when of particulate nature, is arranged in intimate juxtaposition to form an apparently unbroken liquid receptive surface, yet substantially each particle individually is available for contact with applied liquid.

Polymeric materials of sufficient activity in an acid sense and suitable for use in this invention because they are oil-soluble are disclosed in a continuation application for U.S. Letters Patent, Ser. No. 744,601, filed June 17, 1968, now abandoned, based on application for United States Letters Patent Ser. No. 392,404, filed Aug. 27, 1964, by Robert E. Miller and Paul S. Phillips, Jr., now abandoned.

Among the oil-soluble organic polymeric materials suitable for use in this invention together with appropriate solvents to be used therewith, acid-reaction phenol-aldehyde and phenol-acetylene polymers, maleic acid-rosin resins partially or wholly hydrolyzed styrene-maleic anhydride copolymers and ethylene-maleic anhydride copolymers, carboxy polymethylene (Carbopol 934), and wholly or partially hydrolyzed vinyl methyl ether-maleic anhydride copolymer are specified as typical of the reactive acidic polymeric materials.

Among the phenol-aldehyde polymers found useful are members of the type commonly referred to as novolaks, which are characterized by solubility in common organic solvents and which are, in the absence of cross-linking agents, permanently fusible. Another group of useful phenol polymeric materials are alkylphenol-acetylene resins, likewise soluble in common organic solvents and possessing permanent fusibility in the absence of being treated by cross-linking materials. Generally, the phenolic polymer materials useful in practicing this invention are characterized by the presence of free hydroxyl groups and by the absence of groups, such as methylol, which tend to promote infusibility or cross-linking of the polymer, and by their solubility in organic solvents and relative insolubility in aqueous media.

A laboratory method useful in the selection of suitable phenolic resins is a determination of the infrared radiation absorption pattern of a candidate material. It has been found that phenolic resins showing an absorption in the 3200–3500 cm.$^{-1}$ region (which is indicative of the free hydroxyl groups) and not having an absorption in the 1600–1700 cm.$^{-1}$ region are suitable. The latter absorption region is indicative of the desensitization of the hydroxyl groups and consequently makes such groups unavailable for reaction with the chromogenic material to be specified.

The liquid solvent portion of this invention is capable of dissolving the mark-forming components. The solvent can be volatile or nonvolatile, and a single or multiple component solvent which is wholly or partly volatile can be used. Examples of volatile solvents useful with the benzopyran and acidic polymer mark-forming components specified are toluene, petroleum distillate, perchloroethylene, and xylene. Examples of nonvolatile solvents are high-boiling-point petroleum fractions and chlorinated diphenyls.

Generally, the solvent forming the vehicle to a large extent should be chosen so as to be capable of dissolving at least 1%, on a weight basis, of the benzopyran, preferably in excess of 2%, and a larger amount of polymeric material—up to, say 15% or more—to form an efficient reaction. However, in the preferred system, the solvent should be capable of dissolving an excess of the polymeric material, so as to provide every opportunity for maximum reaction utilization of the benzopyran and thus to assure the maximum coloration at a reaction site.

A further criterion of the selected solvent is that it must not interfere with the mark-forming reaction. In some instances, the presence of the solvent may interfere with the mark-forming reaction or diminish the intensity of the mark, in which case the solvent chosen should be efficiently vaporizable to assure its leaving the reaction site after having, through solution, brought the mark-forming components into intimate admixture, so that the mark-forming reaction proceeds.

In the base-acid color system, as stated above, the polymeric mark-forming component(s) chosen must be acidic relative to the benzopyran compound and reactive with the benzopyran material to effect the distinctive color formation or color change.

Kaolin is generally known and used in the papermaking industry as "china clay" and is outstandingly preferable as a particulate oil-insoluble and water-insoluble mineral material of acid characteristics necessary to color the benzopyrans of this invention. A white kaolin is used, and, because of its whiteness, its plate-like particle form, which gives it unparalleled coating properties in aqueous slurries, its universal abundance in supply, its historical general usage in the papermaking and paperconverting industries, and its low cost, it is an ideal material. Other types of particulate and substantially colorless water- and oil-insoluble minerals of the necessary acid properties are deemed equivalents of kaolin, some being bentonites.

Attapulgite can be used in this invention as an efficient colorless mineral reactant material to color the benzopyrans of this invention that react on contact in an electron-donor-acceptor reaction, and, by reason of its high oil absorbency, is doubly useful as an absorbent reactant coating on paper to form color with such compounds dissolved in oil as may be applied to it.

Various methods known to the prior art and disclosed in the aforementioned application Ser. No. 392,404 to Miller, et al., now abandoned and U.S. Patent application Ser. No. 420,193 to Phillips, et al., now U.S. Patent 3,455,721 can be employed in coating compositions of the mark-forming materials into their supporting sheets. An example of the compositions which can be coated onto the surface of an underlying sheet of a two-sheet system to react with the capsule coating of the underside of an overlying sheet is as follows:

| Coating composition: | Percent by weight |
| --- | --- |
| Phenolic polymer mixture | 17 |
| Paper coating kaolin (white) | 57 |
| Calcium carbonate | 12 |
| Styrene butadiene latex | 4 |
| Ethylated starch | 8 |
| Gum arabic | 2 |
| | 100 |

All of the above-described materials, solvents, systems and the like, except for the benzopyrans of this invention, are further described in U.S. Patent 3,491,117.

The advantages of this invention are further illustrated by the following examples. The reactants and the proportions and other specific conditions are presented as being typical and should not be constructed to limit the invention unduly.

EXAMPLE 1

Preparation of 5-dimethylamino-spiro-[isofuran-1(3H)-2'(2H)-1-benzopyran-3-one]

A mixture of coumarin (7.3 g., 0.05 m.), m-dimethylamino benzoic acid (8.4 g., 0.05 m.) and phosphorous oxychloride (20 ml.) was heated to 102± 2° C. for three hours, cooled and added slowly to 300 g. of a mixture of ice-water (1:2). Heat was applied until the temperature reached 80° C., and removed to allow the reaction mixture to cool to room temperature while being mechanically stirred and then to 15°–20° C. employing an external cooling. The precipitate was filtered off, and the filtrate neutralized with a 10% aqueous sodium hydroxide solution to a pH of 3, affording a mixture of a dark oil and a solid. The precipitate was extracted with 60–80 ml. of hot benzene twice; the combined extract was washed with a 2% aqueous solution of sodium bicarbonate, followed by water, and concentrated to 20–25 ml. The addition of 75–100 ml. of petroleum ether (low boiling point) precipitated a blue solid, and the filtrate concentrated to 2–4 ml. On standing, a solid separated was filtered, washed with a mixture of benzene-petroleum ether (1:2), affording the crude title compound, weighing 90 mg. It was recrystallized from benzene-petroleum ether to yield the title color reactant melting at 181–182° C. A benzene solution of the compound yielded a purple color upon contact with sheet coated with phenolic resin.

EXAMPLE 2

Preparation of 5',7'-dimethoxy-5-dimethylamino-spiro-[isofuran-1(3H)-2'(2H)-1-benzopyran-3-one The preparation of the title compound was carried out according to the procedure described in Example 1 except for the substitution of coumarin by 5,7-dimethoxycoumarin. The crude product weighed 150 mg. Upon recrystallization from benzene-petroleum ether, the color reactant obtained melted at 202–203° C. A benzene solution of the compound yielded a purple color upon contact with a sheet coated with a phenolic resin.

EXAMPLE 3

Preparation of 7'-dimethylamino-spiro-[isofuran-1(3H)-2'(2H)-1-benzopyran-3-one]

4-dimethylaminosalicylaldehyde (1.6 g., 0.01 m.) O-acetylbenzoic acid (1.6 g., 0.01 m.) were dissolved in 40 ml. of ethyl acetate. Anhydrous hydrogen chloride gas was bubbled through the solution for seven hours. A precipitate was formed which gradually redissolved. The reaction mixture was allowed to stand for 48 hours at room temperature, filtered and the filtrate neutralized with 10% aqueous sodium hydroxide to a pH of 8. The mixture was extracted with 100 ml. of benzene, and the benzene solution was shaken with 50 ml. of 3 N hydrochloric acid twice. The acid solution was neutralized and extracted with benzene as before. The benzene solution was washed with water, concentrated to about 5 ml., treated with petroleum ether until the supernatant solution was wine colored. The latter was decanted and upon standing afforded the crude title compound, weighing 50 mg., melting at 180–183° C. Recrystallization from benzene-petroleum ether yielded a reactant which melted at 190–192° C. A benzene solution of the color reactant yielded a red color upon contact with a sheet coated with a phenolic resin.

EXAMPLE 4

Preparation of 6'-methyl-5-dimethylamino-spiro[isofuran-1(3H)-2'(2H)-1-benzopyran-3-one The title compound was prepared according to the procedure described in Example 1 except for the substitution of 6-methylcoumarin for coumarin. The color reactant, melting at 203–204° C. A benzene solution of the color reactant yielded a purple color upon contact with phenolic resin coated sheet.

EXAMPLE 5

Preparation of 5-dimethylamino-2'-phenyl-spiro[isofuran-1(3H)-4'(4H)-1-benzopyran-3-one]

Flavone (0.88 g., 4.0 mm.), m-dimethylaminobenzoic acid (0.66 g., 4.0 mm.) and four milliliters of phosphorus oxychloride were heated to 104–106° C. for 30 minutes, cooled, diluted with 10 ml. of acetic acid, poured onto 100 ml. of $H_2O$, and stirred for 15 minutes. To the acidic mixture, under vigorous stirring, 10% aqueous sodium hydroxide was added until the pH rose to about 3, and the supernatant liquid was decanted. The residue was stirred with 100 ml. of benzene and an equal volume of water for 30 minutes, and the layers separated. The benzene solution washed with a 2% aqueous solution of sodium bicarbonate, followed by water, and concentrated to 20 ml. Upon the addition of about 30–40 ml. of petroleum ether, a precipitate was formed and removed by filtration. The filtrate was allowed to crystallize affording 0.4 g. of the crude title compound. Recrystallizations from benzene gave a reactant melting at 206–207° C. A benzen solution of the reactant yielded a blue color upon contact with a phenolic resin sensitized sheet.

EXAMPLE 6

Preparation of 2' - (p-dimethylaminophenyl)-5-dimethylamino - spiro[isofuran - 1(3H) - 4'4H-1-benzopyran-3-one]

The preparation of the title compound involves four steps, i.e. (1) reaction of O-hydroxyacetophenone with p-dimethylaminobenzoyl chloride to give O-(p-dimethylaminobenzoyloxy) acetophenone, (2) the rearrangement of the latter to 4'-dimethylamino-2-hydroxydibenzoylmethane, (3) cyclization of the methane in question to 4'-dimethylaminoflavone and (4) reaction of the said flavone with m-dimethylaminobenzoic acid.

The synthesis of 4-dimethylaminoflavone from O-hydroxyacetophene and p-dimethylaminobenzoyl chloride was carried out according to the procedure described for 4'-nitroflavone by Gowan and Wheeler [J. Chem. Soc., 1927 (1950)]. The said flavone, melting at 156–157° C. (1.3 g., 5.0 mm.) m-dimethylaminobenzoic acid (0.85 g., 5 mm.) and phosphorus oxychloride (5.0 ml.) were heated to 120–125° C. (bath temperature) for five hours, cooled, added dropwise to 100 g. of ice-water (1:1), and stirred for 30–40 minutes. The precipitate was filtered off and washed with water; the filtrate and the wash were combined and neutralized with 10% aqueous sodium hydroxide to a pH of 3. The precipitate was extracted with 100 ml. of hot benzene, and the benzene solution concentrated to about 20 ml. The addition of petroleum ether precipitated a dark solid, leaving a wine solution which upon standing yield 0.16 g. of the crude product. Two recrystallization from benzene-petroleum ether raised the melting point to 255–256° C. A benzene solution of reactant yielded a blue color upon contact with a phenolic resin sensitized sheet.

EXAMPLE 7

Preparation of 2' - (3,4-dimethoxyphenyl)-5-dimethylamino - spiro[isofuran-1(3H)-4'(4H)-1-benzopyran-3-one]

The title compound was prepared according to the method described in Example 6 except for the substitution of 3,4-dimethoxybenzoyl chloride for 4-dimethylaminobenzoyl chloride. The 3,4-dimethoxyflavone obtained melted at 151–152° C. Its reaction with m-dimethylaminobenzoic acid led to a color reactant, melting at 124–126° C. A benzene solution of the reactant yielded a green color upon contact with a phenolic resin sensitized sheet and a neutral color upon contact with an attapulgite (clay) sensitized sheet.

EXAMPLE 18

Preparation of 5-dimethylamino-2'-(p-nitrophenyl)-spiro [isofuran-1(3H)-4'(4H)-1-benzopyran-3-one]

The preparation of the title compound was carried out according to Example 6 except for the substitution of p-nitrobenzoyl chloride for p-dimethylaminobenzoyl chloride. The 4'-nitroflavone melted at 235–236° C. It was reacted with m-dimethylaminobenzoic acid to give a color reactant, melting at 263–264° C. A benzene solution of the reactant yielded a green color upon contact with a sheet coated with a phenolic resin.

EXAMPLE 9

Preparaion of 2'-(p-aminophenyl)-5-dimethylamino-spiro [isofuran-1(3H)-4'-1-benzopyran-3-one]

The color reactant prepared in Example 8 was reduced with stannous chloride according to Gowan and Wheeler (see reference above) to afford a color reactant which produced a blue-black color upon contact with a sheet coated with a phenolic resin.

EXAMPLE 10

Preparation of 2'-(p-acetamidophenyl)-5-dimethylamino-spiro[isofuran-1(3H)-4'(4H)-1-benzopyran-3-one]

The amino compound prepared in Example 9 was acetylated with a mixture of acetic anhydride-water (1:1), affording a brilliantly green color reactant, melting at 266–267° C.

EXAMPLE 11

The benzopyran compounds of Example 4 and Example 7 were encapsulated, coated and tested according to the following procedures.

7.2 grams of 11% gelatin sol, 4.8 grams of 11% gum arabic sol, 0.63 grams of 5% polyvinylmethylether/maleic anhydride solution (PVM/MA) and 38 grams of water were placed in a beaker. The beaker was heated to 55° C. and the pH of the contents was adjusted to 9.0 with a NaOH solution.

10 ml. of a previously prepared internal phase was dispersed in the above solution. The internal phase was prepared by admixing about 1.0 to 1.5% by weight of each of the above-mentioned benzopyran compounds in a 2:1 mixture by weight of monoisopropyl biphenyl and magnaflux oil.

The resulting solution was then agitated to get 100–200 micron droplets. The contents was passed through a prewarmed homogenizer three times to get oil droplets 2 to 7 microns in size. After adjusting the temperature to 55° C., the pH was lowered very slowly to 4–6 with dilute acetic acid. The beaker was chilled to 10° C. in an ice bath. When chilled, 0.4 ml. of 25% glutaraldehyde solution was added. The contents then was stirred overnight.

The capsules were then coated onto the back side of a sheet of paper by conventional methods, dried and tested as follows. The back side of the coated paper was placed in contact with a phenolic resin sensitized sheet. The aplication of pressure on the front side of the sheet produced a distinctive mark on the resin sensitized sheet. 6'-methyl-5 - dimethylamino-spiro[isofuran-1(3H)-2'(2H)-1-benzopyran-3-one] yielded a purple mark and 2',(3,4-dimethioxyphenyl - 5 - dimethylamino-spiro[isofuran-1(3H)-4' (4H)-1-benzopyran-3-one] yielded a green mark.

Although this invention has been described in considerable detail, it must be understood that such detail is for the purposes of illustration only and that many variations and modifications can be made by one skilled in the art without departing from the scope and spirit thereof.

What is claimed is:

1. A benzopyran compound represented by the formula:

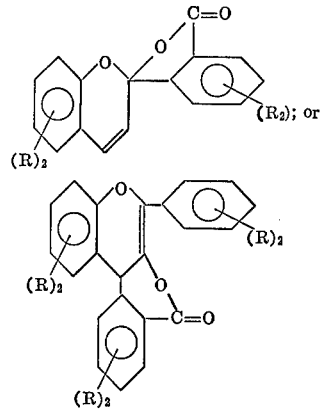

wherein each R is hydrogen, alkyl of 1 to 5 carbon atoms, alkoxy of 1 to 5 carbon atoms, dialkylamino wherein each alkyl has 1 to 5 carbon atoms, amino radical, nitro radical or acetamido.

2. A compound according to claim 1 wherein said compound is 5 - dimethylamino-spiro[isofuran - 1(3H)-2' (2H)-1-benzopyran-3-one].

3. A compound according to claim 1 wherein said compound is 5',7'-dimethoxy-5-dimethylamino-spiro[isofuran-1(3H)-2'(2H)-benzopyran-3-one].

4. A compound according to claim 1 wherein said compound is 7'-dimethylamino-spiro[isofuran-1(3H)-2'(2H)-1-benzopyran-3-one].

5. A compound according to claim 1 wherein said compound is 6' - methyl - 5-dimethylamino-spiro[isofuran-1 (3H)-2'(2H)-1-benzopyran-3-one].

6. A compound according to claim 1 wherein said compound is 7'-dimethylamino-5-nitro-spiro[isofuran-1(3H)-2'(2H)-1-benzopyran-3-one].

7. A compound according to claim 1 wherein said compound is 2' - phenyl - 5-dimethylamino-spiro[isofuran-1 (3H)-4'(4H)-1-benzopyran-3-one].

8. A compound according to claim 1 wherein said compound is 2' - (p-dimethylaminophenyl)-5-dimethylamino-spiro[isofuran-1(3H)-4'(4H)-1-benzopyran-3-one].

9. A compound according to claim 1 wherein said compound is 2'-(3,4-dimethoxyphenyl)-5-dimethylamino-spiro-[isofuran-1(3H)-4'(4H)-1-benzopyran-3-one].

10. A compound according to claim 1 wherein said compound is 5 - dimethylamino-2'-(p-nitrophenyl)-spiro [isofuran-1(3H)-4'(4H)-1-benzopyran-3-one].

11. A compound according to claim 1 wherein said compound is 2'-(p-aminophenyl)-5-dimethylamino-spiro [isofuran-1(3H)-4'(4H)-1-benzopyran-3-one].

12. A compound according to claim 1 wherein said compound is 2' - (p-acetamidophenyl)-5-dimethylamino-spiro[isofuran-1(3H)-4'(4H)-1-benzopyran-3-one].

References Cited

UNITED STATES PATENTS 3,438,999   4/1969   Schwarz et al. _____ 260—343.3

ALEX MAZEL, Primary Examiner
A. M. T. TIGHE, Assistant Examiner

U.S. Cl. X.R.
117—36.2